United States Patent Office 2,823,207
Patented Feb. 11, 1958

---

2,823,207

4-HYDROXYMETHYL- AND 4-ACETOXYMETHYL-2-METHYL-$\Delta^2$-THIAZOLINES AND PREPARATION THEREOF

Jean Marie Nys and Marcel Jan Libeer, Mortsel-Antwerp, Belgium, assignors to Gevaert Photo-Producten N. V., Mortsel, Belgium, a Belgian company No Drawing. Application July 20, 1956
Serial No. 598,996

7 Claims. (Cl. 260—306.7)

This invention relates to 4-hydroxymethyl- and 4-acetoxymethyl substituted 2-methylthiazolines and to a process for preparing them.

Thiazolines with a methyl substituent in the 2-position have long been known. Some of these thiazolines have been found to be quite useful intermediates in preparing sensitizers for photographic emulsions.

We have now found an entirely new class of 2-methyl-$\Delta^2$-thiazolines which are very useful intermediates in preparing new cyanine dyestuffs.

It is, accordingly, an object of our invention to provide a new class of 2-methyl-$\Delta^2$-thiazolines.

A further object is to provide methods for preparing the new compounds. A still further object of our invention is to provide new intermediates which are useful in the preparation of optical sensitizing dyes for photographic emulsions. Other objects will become apparent from a consideration of the following description and examples.

According to our invention, we provide new 2-methyl-$\Delta^2$-thiazolines represented by the following general formula

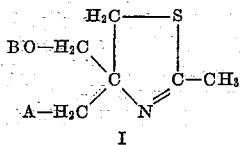

I wherein A represents an hydroxyl or acetoxy radical or hydrogen and B represents an acetyl radical or hydrogen.

It is known that 2-methyl-$\Delta^2$-thiazoline may be obtained with a sufficient yield by ring closure of N-acetyl-2-aminoethanol under influence of phosphorus pentasulfide, as illustrated by the following schema:

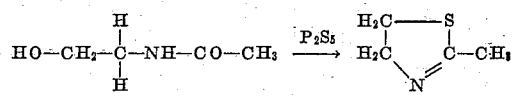

We have tried to prepare in the same manner the desired new 4-hydroxymethyl and 4-acetoxymethyl substituted 2-methyl-$\Delta^2$-thiazolines starting from N-acetyl-$\beta$-polyhydroxy-t-butylamines of the following formula

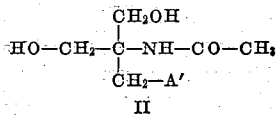

II wherein A' represents a hydroxy radical or hydrogen.

However, when the N-acetyl-$\beta$-polyhydroxy-t-butyl-amines of Formula II were submitted to the action of phosphorous pentasulfide, the corresponding thiazolines were obtained in repelling low yields: N-acetyl-$\beta,\beta'$-dihydroxy-t-butylamine (Formula II, A'=H) gives the corresponding 2,4-dimethyl-4-hydroxymethyl-thiazoline in a yield of only 10% (unpurified) when heated with phosphorus pentasulfide, while with N-acetyl-$\beta,\beta',\beta''$-trihydroxy-t-butylamine (Formula II, A'=OH), only traces of 2-methyl-4-4-bis-(hydroxymethyl)-thiazoline are obtained.

In both cases, a definite induction period is observed, whereafter the reaction suddenly starts, with extensive tarring of the reaction mixture.

As the classical methods for the preparation of the desired thiazolines turned out to be either impossible or unpractical in the present case, a new route to $\Delta^2$-thiazolines was successfully tried, starting from the corresponding $\Delta^2$-oxazolines.

According to the process of our invention, 2-methyl-4,4-bis-(hydroxymethyl)-oxazoline (Formula III, A'=OH) and 2-4-dimethyl-4-hydroxymethyloxazoline (III, A'=H) are heated for a few minutes with thiobenzoic acid in pyridine solution, whereby ring-opening occurs, giving with good yields N-acetyl-$\beta$-benzoylthio-$\beta',\beta''$-dihydroxy-t-butylamine (IV, A'=OH) and N-acetyl-$\beta$-benzoylthio-$\beta'$-hydroxy-t-butylamine (IV, A'=H) respectively, as illustrated by the following schema:

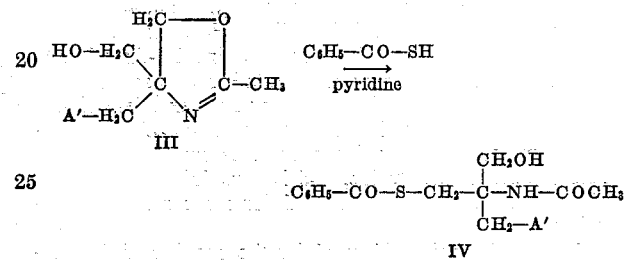

IV

A' representing an hydroxyl radical or hydrogen.

A suspension of these thiol-esters (Formula IV, A'=H or OH) in 2 N sodium hydroxide is gradually transformed into a clear solution by shaking at room-temperature. On acidification with 2 N hydrochloride acid, the theoretical amount of benzoic acid that would result from the selective saponification of the thiol-ester function precipitates, and is removed by filtration. The filtrate, which is an aqueous solution of the resulting thiol mixed with sodium chloride, is then carefully evaporated to dryness under an atmosphere of nitrogen, in vacuo. The thiols obtained correspond to the following formula

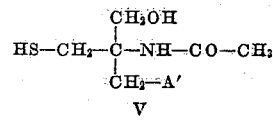

V wherein A' represents an hydroxyl radical or hydrogen.

After this evaporation, the pure thiol-derivatives freed from the accompanying sodium chloride are finally obtained by extracting the residue with anhydrous ethanol. The thus obtained alcoholic solution evaporated in vacuo under nitrogen, leaves a sirupy liquid, which may be identified as the thiol-derivative of Formula V by its transformation into the corresponding 2,4-dinitrophenyl-thioether corresponding to Formula VI

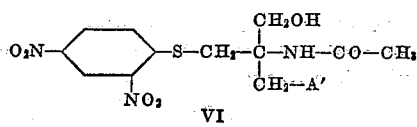

VI when treated with 2,4-dinitrochlorobenzene in alkaline solution.

The thiol-derivatives of Formula V react with boiling acetic anhydride to yield two new compounds
$C_{12}H_{19}O_6NS$
and $C_{10}H_{17}O_4NS$, respectively, to which the structure represented by Formula VII appears to be ascribed.

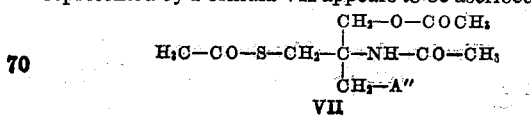

VII wherein A" represents an acetoxy radical or hydrogen.

When submitted to distillation at atmospheric pressure, the polyactyl derivatives of Formula VII easily undergo ring-closure with simultaneous elimination of acetic acid, to yield the corresponding 4-acetoxymethyl substituted thiazolines corresponding to Formula I, A representing an acetoxy radical or hydrogen and B representing an acetyl radical.

These 4-acetoxymethyl-thiazolines may also be obtained without isolating the polyacetyl-derivatives of Formula VII, when the reaction mixture, obtained by boiling the thiol derivatives of Formula V with acetic anhydride, is directly distilled at atmospheric pressure.

The ester functions in the 4-acetoxymethyl-thiazolines of Formula I (A=CH$_3$COO or H, B=CH$_3$CO) are easily saponified, without rupture of the thiazoline-ring, on treatment with a barium- or sodium-hydroxide solution: 2-methyl-4,4-bis-(acetoxymethyl)-thiazoline (Formula I, A=CH$_3$COO and B=CH$_3$CO) yields the desired 2-methyl-4,4-bis-(hydroxymethyl)-thiazoline (Formula I, A=OH and B=H) while under analogous conditions 2,4-dimethyl-4-acetoxymethyl-thiazoline (Formula I, A=H and B=CH$_3$CO) gives the corresponding 2,4-dimethyl-4-hydroxy-methyl-thiazoline (Formula I, A=H and B=H).

All these reactions afford good or even excellent yields. The new method for the preparation of thiazolines, starting from the corresponding oxazolines consequently possesses a preparative value, and is a useful tool when the classical methods appear to fail for some reason or another.

The thiobenzoic acid, used for the opening of the oxazoline-ring of the compounds of Formula III was prepared according to O.Kym. Ber. 32 (1899), 2065. The 4-hydroxymethyl-2-methyl-$\Delta^2$ - oxazolines represented by Formula III above can advantageously be prepared by refluxing a mixture consisting of the $\beta$-polyhydroxy-t-butyl-amines of Formula VIII

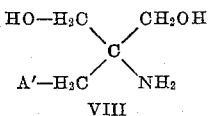

VIII wherein A' represents an hydroxyl radical or hydrogen, and acetic acid, with simultaneously removing the released water. The desired oxazolines may also be prepared by refluxing in a Dean and Stark apparatus, whilst removing the released water, a xylenic solution of the $\beta$-polyhydroxy-t-butylamine acetates, obtained by warming up at 80° C. the $\beta$-polyhydroxy-t-butylamines of Formula VIII with acetic acid (see J. Nys and J. Libeer, Bull. Soc. Chim. Belge 65 (1956), 311–402).

*Preparation of the 2-methyl-4,4-bis(hydroxymethyl)-oxazoline*

(Formula III, A'=OH)

(1) From $\beta,\beta',\beta''$ - trihydroxy - t - butylamine (VIII, A'=OH).

$\beta,\beta',\beta''$ - trihydroxy - t - butylamine (24 g.) was dissolved in acetic acid (18 ml.) and the mixture heated under reflux in a fractionating column assembly provided with an adequate still head. The water, liberated during the reaction, was continuously removed. After the theoretical amount of water (7.2 ml.) had distilled, the residual light-yellow liquid was further distilled in vacuo. The fraction, distilling over the range 150–165° C. under a vacuum of 5 mm. Hg. was dissolved in boiling dioxane. Diethyl ether was cautiously added to the hot solution until a slight turbidity was produced. After cooling, the precipitated crystalline solid was removed by filtration.

Recrystallisation from chloroform-ether and finally from ethylacetate gave the pure oxazoline, melting point 95–97° C.

(2) From the acetate of $\beta,\beta',\beta''$ - trihydroxy-t-butyl-amine.

A mixture of $\beta,\beta',\beta''$-trihydroxy-t-butylamine (4.85 g.) and acetic acid (2.4 ml.) was heated at 85° C. until a homogeneous solution was obtained. The product obtained by chilling the solution recrystallised from ethanol-methylcellosolve, M. P. 120–121° C.

The thus obtained t-butylamine-acetate was heated under reflux with xylene (150 ml.) for 3 hours, in a Dean and Stark apparatus. On cooling, a white crystalline solid separated which on fractional recrystallisation from acetone yielded $\beta,\beta',\beta''$-trihydroxy-t-butylamine (M. P. 169° C.) and 2-methyl-4,4-bis-(hydroxymethyl)-oxazoline (M. P. 95–97° C.).

*Preparation of 2,4-dimethyl-4-hydroxymethyl-oxazoline*

(Formula III, A'=H)

This was prepared in the same manner as the corresponding 4,4'-bis-(hydroxymethyl)-derivative (Formula III, A'=OH), from $\beta,\beta'$-dihydroxy-t-butylamine (Formula VIII, A'=H, 21 g.) and acetic acid (13 ml.). The crude 2,4-dimethyl-4-hydroxymethyl-oxazoline, which remained in the reaction flask as a syrupy liquid after the liberated water and the excess acetic acid were removed under reduced pressure, was purified by distillation at atmospheric pressure, B. P. 207–209° C. It crystallised on standing overnight at 0° C., M. P. 30–31° C.

The following examples will serve to illustrate more fully the manner whereby we practice our invention:

EXAMPLE 1.—2-METHYL-4,4-BIS-(ACETOXYMETHYL)-THIAZOLINE (Formula I, A=CH$_3$COO and B=CH$_3$CO)

2-methyl-4,4-bis-(hydrozymethyl)-oxazoline (12.4 g.) was added with stirring to a solution of thiobenzoic acid (11.8 g.) in 33 ml. of pyridine and the mixture was kept in a water-bath at 95° C. for 5 minutes. The reaction mixture was chilled and made slightly acid with hydrochloric acid. A precipitate appeared, which was filtered off and washed three times with water. It recrystallised from ethanol to give pure N-acetyl-$\beta$-benzoylthio-$\beta',\beta''$-dihydroxy-t-butylamine, M. P. 147–148° C. (Formula IV, A'=OH).

*Analysis.*—N calculated, 4.95%; N found, 4.83%. S calculated, 11.31%; S found, 11.20%.

A suspension of N-acetyl-$\beta$-benzoylthio-$\beta',\beta''$-dihydroxy-t-butylamine (19 g.) in 100 ml. of 2 N sodium hydroxide was heated at 55° C. with stirring until a clear solution was obtained (any insoluble material was filtered-off). The solution was cooled, acidified with hydrochloric acid, and the precipitated benzoic acid removed by filtration. The filtrate was then evaporated to dryness in vacuo and under nitrogen. The residual oily solid consisting of N-acetyl-$\beta$-mercapto-$\beta',\beta''$-dihydroxy-t-butylamine (Formula V, A'=OH) and sodium chloride was extracted with ethanol. The ethanol-extract was re-evaporated to dryness in vacuo and under nitrogen. The residual oil was then immediately dissolved in 35 ml. of acetic anhydride. This solution was heated under reflux for 1 hour. The liberated acetic acid and the excess of acetic anhydride were removed under reduced pressure. A solid remained, which recrystallised from benzene-ligroin to yield pure N-acetyl-$\beta$-acetylthio-$\beta',\beta''$-diacetoxy-t-butylamine, M. P. 94° C. (Formula VII, A"=CH$_3$COO).

*Analysis.*—S calculated, 10.50%; S found, 10.40%.

N-acetyl-$\beta$-acetylthio-$\beta',\beta''$-diacetoxy-t-butylamine (15 g.) (which need not be isolated, as shown below in the preparation of 2,4-dimethyl-4-acetoxymethyl-thiazoline, see Example 2) were heated in a fractionating column assembly provided with an adequate still head, and the acetic acid, liberated during the reaction was continuously removed at atmospheric pressure. After the theoretical amount of acetic acid had distilled, the residual liquid was further distilled in vacuo. Twice repeated rectification in vacuo yielded pure 2-methyl-4,4-bis-(acetoxymethyl)-thiazoline, B. P. 169° C./14 mm. and 144° C./2 mm. $n_D^{20}=1.4942$.

*Analysis.*—N calculated, 5.71%; N found, 5.72%. S calculated, 13.06%; S found, 12.90%.

EXAMPLE 2.—2,4-DIMETHYL-4-ACETOXYMETHYL-THIAZOLINE (Formula I, A=H, B=CH₃CO)

2,4-dimethyl-4-hydroxymethyl-oxazoline (17.4 g.) was added with stirring to a solution of thiobenzoic acid (18.6 g.) in 60 ml. of pyridine and the mixture was kept in a water-bath at 95° C. for 5 minutes. The reaction mixture was chilled and made slightly acid with hydrochloric acid. A precipitate appeared, which was filtered off and washed three times with water. It recrystallised from ethanol to give pure N-acetyl-β-benzoylthio-β'-hydroxy-t-butylamine, M. P. 140–142° C. (Formula IV, A'=H).

*Analysis.*—N calculated, 5.24%; N found, 5.18%. S calculated, 11.99%; S found, 11.90%.

A suspension of N-acetyl-β-benzoylthio-β'-hydroxy-t-butylamine (22.6 g.) in 117 ml. of 2 N sodium hydroxide was heated on the water-bath at 60° C. for ½ hour, with stirring (any insoluble material was filtered-off). The solution was chilled, acidified with hydrochloric acid, and the precipitated benzoic acid removed by filtration. The filtrate was then evaporated to dryness, in vacuo and under nitrogen. The residual crystalline paste (N-acetyl-β-mercapto-β'-hydroxy-t-butylamine (Formula V, A'=H)+sodium chloride) was extracted with anhydrous ethanol. The ethanol extract was re-evaporated to dryness in vacuo and under nitrogen. Acetic anhydride (15 ml.) was then added to the residual oil, and the mixture was heated under reflux for 1 hour. The reaction mixture was then submitted to fractional distillation. After the liberated acetic acid and the excess of acetic anhydride were removed, the crude 2,4-dimethyl-4-acetoxymethyl-thiazoline came over at 228°/760 mm. It was purified by two rectifications in vacuo. The pure thiazoline, had B. P. 230° C./760 mm. and 94° C./5 mm.; $n_D^{20}=1.4927$.

*Analysis.*—N calculated, 7.49%; N found, 7.53%.

EXAMPLE 3.—2-METHYL-4,4-BIS-(HYDROXYMETHYL)-THIAZOLINE (Formula I, A=OH, B=H)

2-methyl-4,4-bis-(acetoxymethyl)-thiazoline (see Example 1) (24.5 g.) were dissolved in 100 ml. of water. The mixture was warmed up at 40° C. and barium hydroxide 8 aq. (31.5 g.) was fractionally added during one hour with stirring. Stirring and heating were continued for ½ hour, whereafter the mixture was freed by filtration from a small quantity of barium carbonate. The filtrate was then evaporated to dryness in vacuo. The remaining crystalline paste was extracted with hot acetone (60 ml.). The acetone extract was evaporated to dryness, leaving a solid which was recrystallized from acetone-ethyl acetate to give pure 2-methyl-4,4-bis-(hydroxymethyl)-thiazoline, M. P. 75° C.

EXAMPLE 4.—2,4-DIMETHYL-4-HYDROXYMETHYL-THIAZOLINE (Formula I, A=B, B=H)

2,4-dimethyl-4-acetoxymethyl-thiazoline (see Example 2) (7.50 g.) was added to a solution of potassium hydroxide (2.25 g.) in 40 ml. of anhydrous ethanol. The mixture was then heated under reflux for 8 hours. The ethanol was removed at the pump, and the remained residue extracted with ether. On evaporating this ethereal solution to dryness, a semi-crystalline paste was obtained, which was recrystallized from ligroine and finally distilled under reduced pressure to give pure 2,4-dimethyl-4-hydroxymethyl-thiazoline, M. P. 40° C., B. P. 108° C./9.5 mm.

*Analysis.*—N calculated, 9.67%; N found, 9.54%. S calculated, 22.07%; S found, 21.98%.

It has been found that the carbon atom of the methyl group in the 2-position of quaternized 4-(hydroxymethyl) or 4-(acetoxymethyl)-substituted 2-methyl-thiazolines shows a markedly more pronounced nucleophilic reactivity than the corresponding carbon atom of the 4-unsubstituted thiazolines. Thus, while the 2-methyl-Δ²-thiazoline quaternary-cyclammonium salts, unsubstituted in the 4-position, generally react reluctantly with suitable intermediates to give the corresponding polymethine dyes, the 4-(hydroxymethyl) or 4-(acetoxymethyl)-substituted 2-methyl-Δ²-thiazolines are, after quaternization, easily condensed in the usual manner to the desired polymethine dyes, e. g. symmetrical trimethine cyanine dyes when the condensation occurs in the presence of ethyl-ortho formate. The enhanced nucleophilic reactivity of the 2-methyl carbon atom is maintained when the 4-substituted thiazoline quaternary cyclammonium salts are condensed with suitable electrophilic intermediates in view of the preparation of asymmetrical trimethine and pentamethine cyanine dyes, merocyanine dyes, styryl dyes, and rhodacyanine dyes.

The method of preparation of all such dyes is fully described in our copending application Serial No. 598,997, filed July 20, 1956.

The new polymethine dyes obtained from the new intermediates according to the present invention spectrally sensitize photographic silver halide emulsions when incorporated therein. The replacement of one or both of the hydrogen atoms in the 4-position of the thiazoline nucleus by one or two hydroxymethyl or acetoxymethyl groups results in a bathochromic shift of the absorption maximum (as well as of the sensitization maximum) of the resulting unsymmetrical cyanine dyes. Further, the new cyanine and merocyanine dyes show a greater solubility in polar solvents than the corresponding dyes derived from Δ²-thiazolines without hydroxymethyl or acetoxymethyl substituent in the 4-position. Thus, residual stains left in the photographic prints by most of the known sensitizing dyestuffs can easily be avoided or to a large extent diminished. More details on the sensitizing properties of the new polymethine dyes obtained from the new intermediates according to our present invention are given in the above referred to copending application Serial No. 598,997.

We claim:

1. A compound selected from those represented by the following general formula:

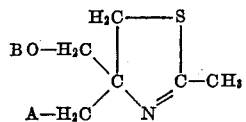

wherein B represents a member selected from the group consisting of an acetyl radical and hydrogen and A represents a member selected from the group consisting of acetoxy and hydroxyl radicals and hydrogen.

2. A compound represented by the following formula:

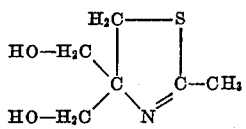

3. A compound represented by the following formula:

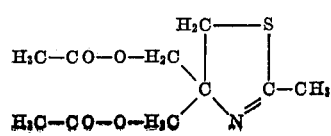

4. A compound represented by the following formula:

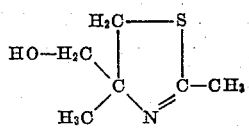

5. A compound represented by the following formula:

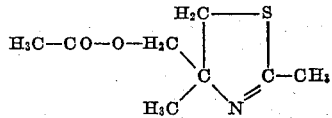

6. A process for preparing compounds of the general formula:

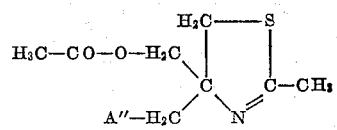

wherein A″ represents a member selected from the group consisting of an acetoxy radical and hydrogen, comprising: (1) opening of the oxazoline-ring of the compound of the formula:

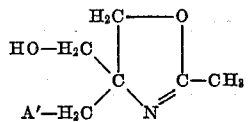

wherein A′ represents a member selected of the group consisting of an hydroxyl radical and hydrogen, by heating with thiobenzoic acid in pyridine solution, (2) saponifying the thus obtained thiolesters to the free thiols by acidifying and (3) subsequently closing the thiazoline-ring by reacting these thiols with boiling acetic anhydride and distilling the reaction mixture at atmospheric pressure.

7. A process for preparing compounds of the general formula:

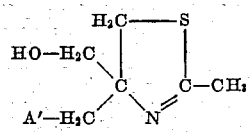

wherein A′ represents a member selected from the group consisting of an hydroxyl radical and hydrogen, comprising saponifying the compounds of the formula:

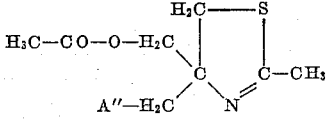

wherein A″ represents a member selected from the group consisting of an acetoxy radical and hydrogen by treating with a barium hydroxyde solution.

No references cited.